United States Patent
Stutes

(10) Patent No.: US 12,314,068 B2
(45) Date of Patent: May 27, 2025

(54) SYSTEM AND METHOD FOR FLOODWATER REDISTRIBUTION

(71) Applicant: Stutes and Son LLC, Sulphur, LA (US)

(72) Inventor: David Stutes, Sulphur, LA (US)

(73) Assignee: Stutes and Son LLC, Sulphur, LA (US)

( * ) Notice: Subject to any disclaimer, the term of this patent is extended or adjusted under 35 U.S.C. 154(b) by 1007 days.

(21) Appl. No.: 17/304,793

(22) Filed: Jun. 25, 2021

(65) Prior Publication Data

US 2021/0405666 A1   Dec. 30, 2021

Related U.S. Application Data

(60) Provisional application No. 62/705,437, filed on Jun. 26, 2020.

(51) Int. Cl.
| | |
|---|---|
| *G05B 13/02* | (2006.01) |
| *E03F 1/00* | (2006.01) |
| *G05D 7/06* | (2006.01) |
| *G06N 3/04* | (2023.01) |
| *G06N 3/08* | (2023.01) |
| *E02B 3/04* | (2006.01) |

(52) U.S. Cl.
CPC ............ *G05D 7/0682* (2013.01); *E03F 1/00* (2013.01); *G05B 13/027* (2013.01); *G06N 3/04* (2013.01); *G06N 3/08* (2013.01); *E02B 3/041* (2015.09)

(58) Field of Classification Search
CPC ....... G05D 7/0682; E03F 1/00; G05B 13/027; G06N 3/04; G06N 3/08; E02B 3/041
See application file for complete search history.

(56) References Cited

U.S. PATENT DOCUMENTS

| | | | |
|---|---|---|---|
| 3,604,389 A | 9/1971 | Roberts et al. | |
| 4,457,646 A | 7/1984 | Laesch | |
| 4,934,404 A | 6/1990 | Destefano | |
| 5,342,144 A * | 8/1994 | McCarthy | E03F 1/00 405/39 |
| 5,360,289 A * | 11/1994 | Takada | E03F 5/22 137/565.33 |

(Continued)

FOREIGN PATENT DOCUMENTS

| | | |
|---|---|---|
| WO | WO2007059561 A1 | 5/2007 |
| WO | WO2019108054 A1 | 6/2019 |
| WO | WO2020044355 A1 | 3/2020 |

OTHER PUBLICATIONS

Gilbertson, D. D. "Runoff (floodwater) farming and rural water supply in arid lands." Applied Geography 6.1 (1986): 5-11. https://pdfslide.net/download/link/runoff-floodwater-farming-and-rural-water-supply-in-arid-lands.

*Primary Examiner* — Gary Collins
(74) *Attorney, Agent, or Firm* — Schultz & Associates, P.C.

(57) ABSTRACT

A system and method for floodwater redistribution is disclosed. The system being comprised of onshore and offshore pump stations and pipelines deployed along the Gulf Coast to redistribute floodwaters to reservoirs located in the western United States. The pump stations include a network of controllers which monitor input/output head pressures and pump speeds and submit the data to the system server to determine the pump settings needed to optimize water flow along the line.

18 Claims, 15 Drawing Sheets

(56) References Cited

U.S. PATENT DOCUMENTS

| | | | |
|---|---|---|---|
| 5,634,740 A * | 6/1997 | Takada | F04D 15/0055 |
| | | | 405/36 |
| 6,109,827 A | 8/2000 | Holloway | |
| 6,554,535 B2 | 4/2003 | Kinno | |
| 6,575,662 B2 * | 6/2003 | French | C02F 1/008 |
| | | | 405/80 |
| 6,766,822 B2 | 7/2004 | Walker | |
| 7,093,551 B2 | 8/2006 | Saho et al. | |
| 7,373,954 B2 | 5/2008 | Zhadanov et al. | |
| 7,798,175 B2 | 9/2010 | Mcbride | |
| 7,857,546 B2 | 12/2010 | Furrer et al. | |
| 8,141,584 B1 | 3/2012 | Ellyson et al. | |
| 8,602,687 B2 * | 12/2013 | Hubbell, Jr. | F04D 29/528 |
| | | | 405/80 |
| 8,924,311 B2 | 12/2014 | Szydlowski et al. | |
| 9,499,249 B2 | 11/2016 | Bowhay | |
| 10,711,787 B1 * | 7/2020 | Darley | F04D 29/4293 |
| 2002/0031402 A1 * | 3/2002 | French | E02B 3/00 |
| | | | 405/80 |
| 2010/0314296 A1 | 12/2010 | Pacheco et al. | |
| 2011/0290329 A1 | 12/2011 | Garza et al. | |
| 2012/0222994 A1 * | 9/2012 | Smaidris | C02F 3/006 |
| | | | 210/97 |
| 2014/0193201 A1 | 7/2014 | Stauffer | |
| 2016/0047098 A1 | 2/2016 | Hontiveros | |
| 2018/0030950 A1 | 2/2018 | Zhong | |
| 2019/0143355 A1 * | 5/2019 | Bollermann | B05B 1/30 |
| | | | 239/1 |
| 2023/0040672 A1 * | 2/2023 | Sadeh | F03B 13/06 |

* cited by examiner

```
1   import numpy as np #advanced mathematical functions needed for neural network
2
3   # X = Input head pressure and output head pressure read at each controller
4   # Y = output pump speeds
5   xAll = np.array(([2, 18], [10, 15], [8, 12], [15, 10], [9, 12]), dtype=float) # input data
6
7   y = np.array(([10, 3, 7], [15, 4, 2], [15, 3, 9], [7, 5, 11], [6, 13, 12]), dtype=float) # output
8
9   # scale units
10  xAll = xAll/np.amax(xAll, axis=0) # scaling input data
11  y = y/15 # scaling output data based on largest possible output value (15 in this example)
12
13  # split data
14  X = np.split(xAll, [5])[0] # training data
15  xPredicted = np.split(xAll, [5])[1] # testing data
16
17  # Create neural network
18  class Neural_Network(object):
19    def __init__(self):
20    #parameters for size of neural network, more hidden layers for deeper learning
21      self.inputSize = 10 # input 5 controller readings for input/output head pressure
22      self.outputSize = 15 # output pump speed for each pump located at a controller (e.g. 3)
23      self.hiddenSize = 11 # 11 weighted nodes
24
25    #weights
26      self.W1 = np.random.randn(self.inputSize, self.hiddenSize) # (11x10) weight to hidden
27      self.W2 = np.random.randn(self.hiddenSize, self.outputSize) # (11x15) weight to output
28
29    #forward propagation through our network
30    def forward(self, X):
31      self.z = np.dot(X, self.W1) # calculate dot product of input and first set of weights
32      self.z2 = self.sigmoid(self.z) # apply activation function
33      self.z3 = np.dot(self.z2, self.W2) # calculate dot product of hidden second set of weights
34      o = self.sigmoid(self.z3) # apply final activation function
35      return o # return prediction
36    # activation function
37    def sigmoid(self, s):
38      return 1/(1+np.exp(-s))
```

FIG. 12A

```
39
40    #derivative of sigmoid
41    def sigmoidPrime(self, s):
42      return s * (1 - s)
43
44    # backward propagate through the network to train
45    def backward(self, X, y, o):
46      self.o_error = y - o # determine error in output
47      self.o_delta = self.o_error*self.sigmoidPrime(o) # apply sigmoid derivative to error
48    # hidden error: how much our hidden layer weights contributed to output error
49    self.z2_error = self.o_delta.dot(self.W2.T)
50    # apply sigmoid derivative to hidden error
51      self.z2_delta = self.z2_error*self.sigmoidPrime(self.z2)
52      self.W1 += X.T.dot(self.z2_delta) # adjust first set weights (input to hidden)
53      self.W2 += self.z2.T.dot(self.o_delta) # adjust second set weights (hidden to output)
54
55    #create output in forward propagation and use backward propagation to train system
56      def train(self, X, y):
57      o = self.forward(X)
58      self.backward(X, y, o)
59
60    # save weights
61    def saveWeights(self):
62      np.savetxt("w1.txt", self.W1, fmt="%s")
63      np.savetxt("w2.txt", self.W2, fmt="%s")
64
65    #prints predicted output after training
66    def predict(self):
67      print ("Predicted data based on trained weights: ");
68      print ("Input (scaled): \n" + str(xPredicted));
69      print ("Output: \n" + str(self.forward(xPredicted)));
```

FIG. 12B

```
70
71    #run neural network
72    NN = Neural_Network()
73    Loss = str(np.mean(np.square(NN.forward(X) - y))) #mean sum squared loss
74    IdealLoss = str(.00001)
75    for i in range(150000):# trains the NN 150,000 times or until ideal loss value
76      if Loss > IdealLoss:
77         print ("# " + str(i) + "\n")
78         print ("Input (scaled): \n" + str(X))
79         print ("Actual Output: \n" + str(y))
80         print ("Predicted Output: \n" + str(NN.forward(X)))
81         print ("Loss: \n" + Loss)
82         print ("\n")
83         NN.train(X, y);
84      else: break #if ideal loss is achieved training ends to reduce computational expense
85
86    NN.saveWeights() #saves optimum weights after training
87    NN.predict() #runs a prediction after training
```

FIG. 12C

SYSTEM AND METHOD FOR FLOODWATER REDISTRIBUTION

CROSS-REFERENCE TO RELATED APPLICATIONS

This application claims priority benefit from U.S. Provisional Application No. 62/705,437 filed on Jun. 26, 2020. The patent application identified above is incorporated here by reference in its entirety to provide continuity of disclosure.

FIELD OF THE INVENTION

The present invention relates to a system for redistributing water from areas experiencing floods to areas experiencing droughts.

BACKGROUND OF THE INVENTION

Water is one of the most prized resources available because it is needed for everything from human consumption to farming and manufacturing. However, many regions in the United States experience consistent droughts while others suffer from damages from extreme flooding. For instance, US Cities along the Gulf Coast often experience the destructive forces of frequent tropical weather systems. Tropical storms and hurricanes are particularly destructive because of the excessive amounts of water produced. The damaging effects of excessive water production are compounded for cities along the Gulf Coast because many are either partially or entirely located below sea level. For instance, roughly 65% New Orleans proper sits below sea level. As a result, rainwater is unable to drain naturally from Gulf Coast cities and must be removed through human intervention.

For example, in New Orleans, redistribution of rainwater is accomplished using a system of pumps as shown in FIGS. 1-2.

Referring then to FIG. 1, New Orleans sits below sea level with many neighborhoods located in "bowl" 118. As a result, rainwater cannot drain out of the city naturally, but must be pumped out. Catch basins 116 allow water in the streets to drain into large pipes and culverts 114 located underground. Interior pumps 102 then lift the water to lower outfall canals, such as lower outfall canal 104. Outfall canal pumps 106, located in the canals, pull water from lower to higher canals, such as higher outfall canal 108, which utilize gravity to carry water to lake 112. Permanent canal closures and pumps 110 are positioned between the higher outfall canals and lake 112. Closures and pumps 110 are utilized to prevent water from flowing from the lake into the city when the water level of the lake is too high.

Referring then to FIG. 2, a typical elevation pump station will be described. Pump station 200 is located on top of sheet pile cut-off wall 216 with lake 212 on one side and canal 220 on the other side. Pump station 200 includes attached generator building 202, control room 206, vertical gear motor pump 208, and vehicle access platform 210. Pump station 200 is further comprised of flood wall 214 on the lake side of the building. Water from canal 220 is pulled through formed suction intake 218 up through vertical gear motor pump 208 and redistributed out to the lake through siphon discharge 204.

The New Orleans system can handle 1 inch of rainfall for the first hour, and 0.5 inches every hour after that. However, when New Orleans experiences rainfall at a higher rate the system backs up and the city floods.

Floodwater redistribution systems, such as the one in New Orleans, are incapable of handling the heavy rainfall of tropical systems. The average hurricane can produce 5.6 trillion gallons of water per day over a 414-mile radius but can range much higher. For instance, Hurricane Harvey produced 33 trillion gallons spanning 28,000 square miles, 162 billion gallons landed in Houston, Texas. It can take hours if not days to drain that amount of water from a city. For example, at peak performance the New Orleans pumping system is capable of pumping water out of the city at a rate of more than 45,000 cubic feet per second and it would take over 5.5 days to pump out 162 billion gallons.

One problem faced by floodwater redistribution is it requires manual oversight to adjust pumps and valves to maintain an even flow. However, during extreme flooding events the flow of water may continually increase and decrease causing unnecessary backups. Furthermore, to keep a consistent flow between pump stations down the line in a floodwater redistribution system each pump station needs to communicate with the other pump stations and determine input and output to optimize flow. Having a single pump station out of sync due to human error may similarly result in unnecessary flow backups.

Another problem presented by floodwater redistribution, is where to redistribute the water. New Orleans distributes a majority of its flood water to surrounding bodies of water. However, much of New Orleans sits below those bodies of water as well, which puts strain on the systems keeping that water.

On the other end of the spectrum, California has experienced multiple record-breaking droughts leading to raging wildfires and extensive loss of property and many lives. In the past, interstate water pipelines have been proposed to divert water to California to ease the effects of the extreme droughts. However, such pipeline projects have been abandoned because no single source of excess water reserves are located nearby without having an extreme environmental impact and were cost prohibitive.

The prior art has attempted to address these challenges.

For instance, U.S. Publication No. 2011/0290329 to Garza, et al. describes a means for redistribution of water over large geographic regions. However, Garza requires a complex network of dozens of reservoirs and underground pipelines moving water from lower to higher elevations exponentially increasing the cost of the system. Furthermore, Garza contemplates integrating the pipeline system with the interstate highway system which results in extended disruptions to the public for construction and maintenance issues.

As another example, U.S. Publication No. 2016/60047098 to Hontiveros discloses a system of supplementing an existing drainage pipe system with elevated pipes using other existing infrastructure. However, Hontiveros does not consider redistribution of the floodwater to replenish reserves for drought areas.

Similarly, U.S. Publication No. 2014/0193201 to Stauffer discloses system for siphoning fresh water from rivers in higher elevations to generate hydro-electric power and irrigate lower elevation regions through gravity. However, Stauffer does not consider floodwater redistribution or the use of pump stations for redistribution over large geographic regions.

As another example, U.S. Pat. No. 7,857,546 to Furrer, et al. discloses a system for system for controlling drainage using terraced reservoirs with interconnected level-responsive valves. However, Furrer does not consider long distance water redistribution.

As yet another example, U.S. Pat. No. 8,141,584 to Ellyson, et al. discloses a system for water collection, recycling, and storage. However, Ellyson is for residential or commercial water storage and does not consider redistribution of floodwater or large-scale storage.

As yet another example, U.S. Publication No. 2020/0277747 to Mariappan discloses a system for mitigating flood water damage using a system of drains and aqueducts. However, Mariappan does not consider redirection of the flood water to drought areas or interstate redirection.

Thus, there exists a need for an efficient means to redistribute floodwaters to a water reserve for regions experiencing drought and optimize flow rate between pumping stations.

SUMMARY OF THE INVENTION

The flood water prevention system is designed to prevent damages from storms and floods and to provide water in areas where needed. Many cities and municipalities are located on or near bodies of water creating a need for large pumping systems capable of handling large volumes of water during storms and flooding. Other areas are located at low or below level elevations where natural water runoff is slow and difficult. This system is designed with reverse flow capabilities thus removing water where needed and transferring to needed areas.

This system consists of on land pump stations in areas where flood relief is needed and pumped to offshore pump stations. The offshore pump stations are located at a lower elevation than the onshore stations to aid in the removal of the floodwaters. Offshore pump stations will be connected with underwater pipeline from Florida to Texas. Pipelines from on shore pump stations to offshore stations will also serve as storage. The system will terminate in the western United States, such as west Texas or Arizona, where one or more large reservoirs will be constructed.

All water entering and leaving the system will be processed through water treatment plants to ensure all environmental requirements are complied with. Each plant and pump station are connected to a central controller which monitors water flow at each pump station and calculates the optimal input and output flow rates to obtain the most efficient flow.

The system will consist of approximately 1700 miles of offshore pipeline along the Gulf Coast, including Florida, Alabama, Mississippi, Louisiana, and Texas. The system is capable of redirecting over 116 billion gallons of floodwater from the Gulf Coast to the reservoirs. On land areas requesting water may also be supplied through additional pipelines.

BRIEF DESCRIPTION OF THE DRAWINGS

In the detailed description of the preferred embodiments presented below, reference is made to the accompanying drawings.

FIGS. 12A, 12B, and 12C is preferred implementation of code for a preferred embodiment of a neural network.

DETAILED DESCRIPTION OF THE INVENTION

Figure 1:
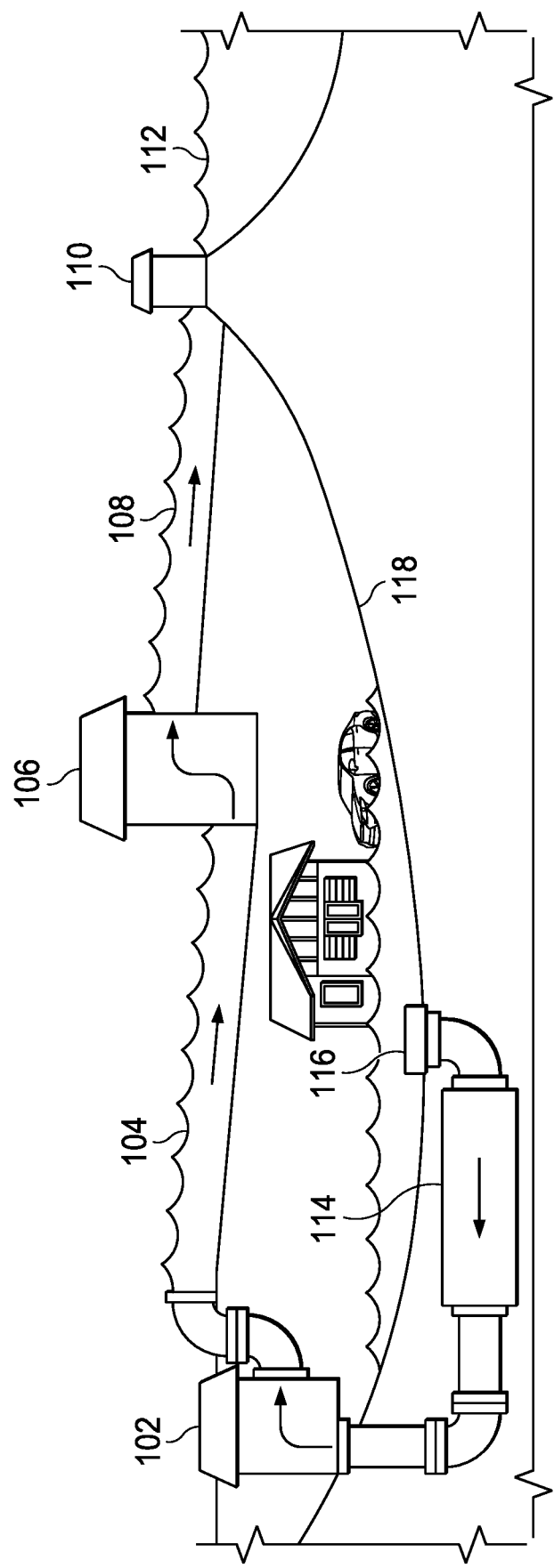
FIG. 1 is an embodiment of a flood water redistribution system in the prior art.
Figure 2:
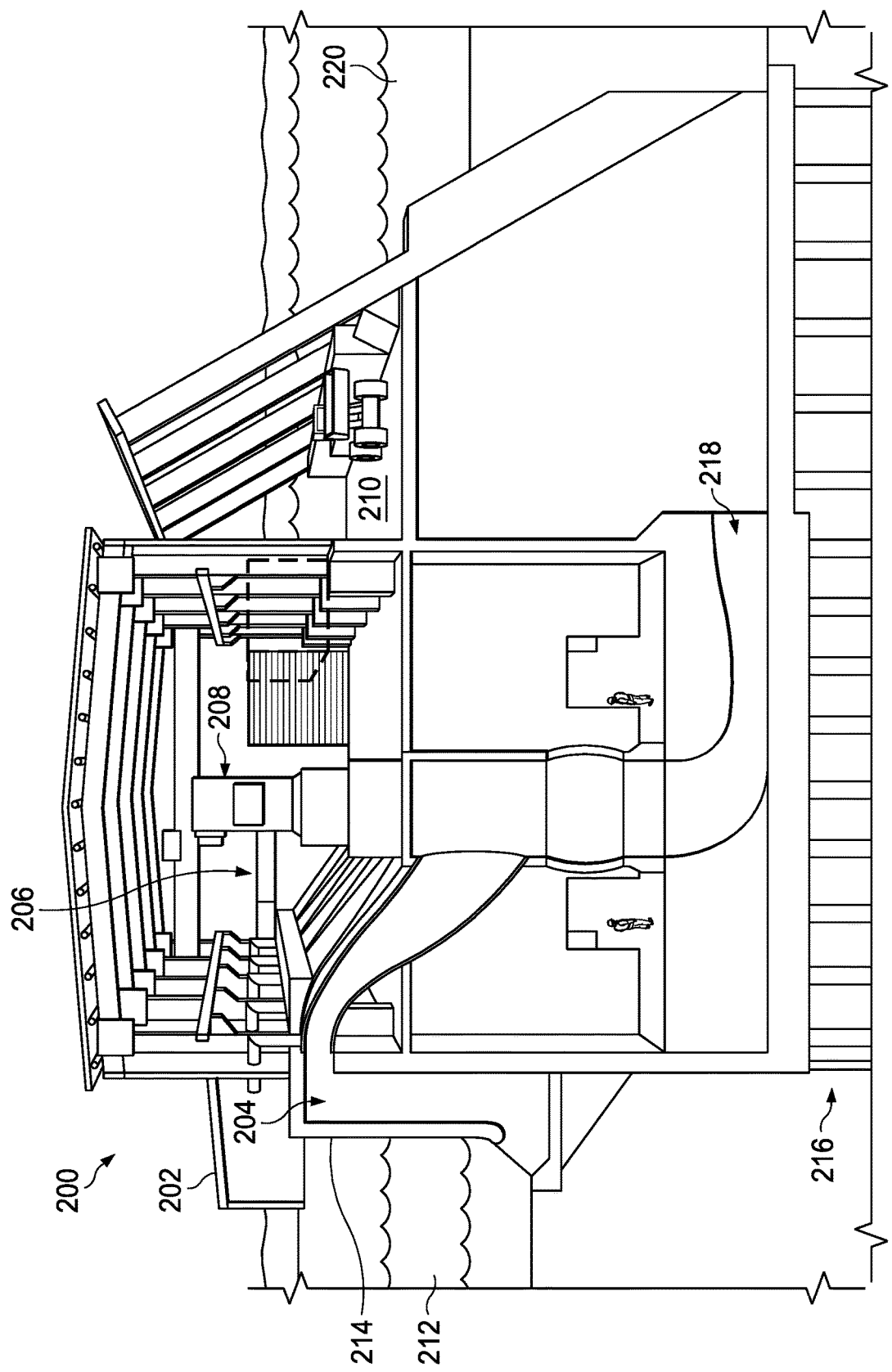
FIG. 2 is an embodiment of a pump station in a flood water redistribution system in the prior art.
Figure 3:
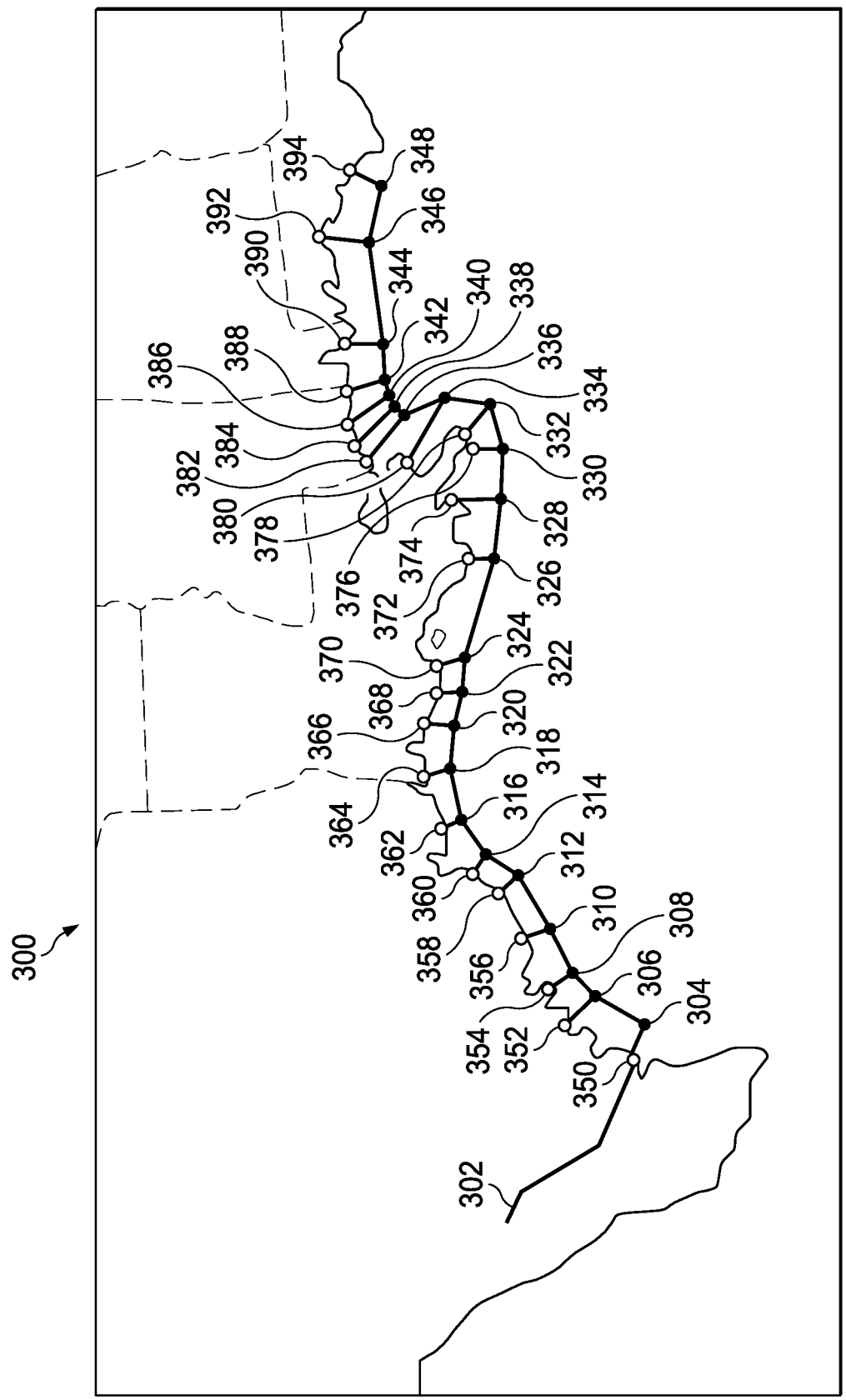
FIG. 3 is a schematic diagram of the locations of pump stations in a preferred embodiment of a flood water redistribution system.

Referring to FIG. 3, flood water redistribution system 300 will be described.

Flood water redistribution system 300 moves flood water from cities along the Gulf Coast including Louisiana and Eastern Texas through the Gulf of Mexico along the coastline. In a preferred embodiment, the floodwater is redirected over onshore line 302 to reservoirs which may be located in Texas, Arizona, and/or California. The flood waters are moved through a series of pumps and pipes, as will be further described.

The invention comprises onshore pump stations 350, 352, 354, 356, 358, 360, 362, 364, 366, 368, 370, 372, 374, 376, 378, 380, 382, 384, 386, 388, 390, 392, and 394. The onshore pump stations use bi-directional tributary pipelines to relocate excess floodwater to offshore platforms, as will be further described. In a preferred embodiment, the pump stations are located in high flood-risk cities. In one embodiment, the pump stations connect with existing redistribution systems. For instance, bi-directional axial flow pumps in intake stations may be used to transfer floodwater from existing overflow systems, such as the river and lake in New Orleans, and transfer the water to the pump stations. Axial pumps have a high flow rate at a very low head (around 30-40') for short distance. For every 12 miles an axial pump requires 200-400' of head range. Thus, an in-line booster pump is used to get the water from the overflow location to pipelines. In another embodiment, the pump stations operate as a secondary standalone intake plant.

Each of the pumps in onshore pump stations are connected to 60" tributary pipelines which carry the water to offshore pump stations 304, 306, 308, 310, 312, 314, 316, 318, 320, 322, 324, 326, 328, 330, 332, 334, 336, 338, 340, 342, 344, 346, and 348. The offshore pump stations are located on existing drilling platforms located in the Gulf of Mexico located in the relatively shallow waters west of Florida and South of Louisiana which range from 100-300' in depth. In a preferred embodiment, the pipelines are bi-directional. The offshore pump stations include submersible or semi-submersible pumps to prevent the need to run the pipeline up to the surface and reduce the costs of creating structural support to change the elevation of the stations. In a preferred embodiment, the offshore pump stations are always located at a lower elevation than the associated onshore pump station in order to use gravity to aid in the efficient removal of floodwaters.

In a preferred embodiment, main pipeline running along the coast is 1,700-2,100 miles long. In one embodiment, the system uses 477 bi-directional pumps with 20 million hp per pipe and is capable of pumping 700,000 GPM. Alternate pipe diameters from 60-144" and pump combinations may be used. Ideally for 60" pipes a pump with around 20-21,000 GPM and a 2,500 hp motor is utilized. For larger pipes custom pumps may be used, for instance for a 144" pipe a pump with 700,000 GPM and a 20 million hp motor is utilized. A practical application can also use a distribution manifold and a number of smaller pumps capable of pumping that much water. More or less flow could be used at the required horsepower. The horsepower required goes up exponentially as GPM is increased due to the higher friction loss and turbulence and water is a non-compressible fluid.

Each of the pump stations are equipped with monitoring and control equipment which allows the water flow to be monitored and controlled from each location. In a preferred embodiment, the system may be monitored and controlled remotely, and flow speed may be optimized using an artificial neural network, as will be further described.

Figure 4:
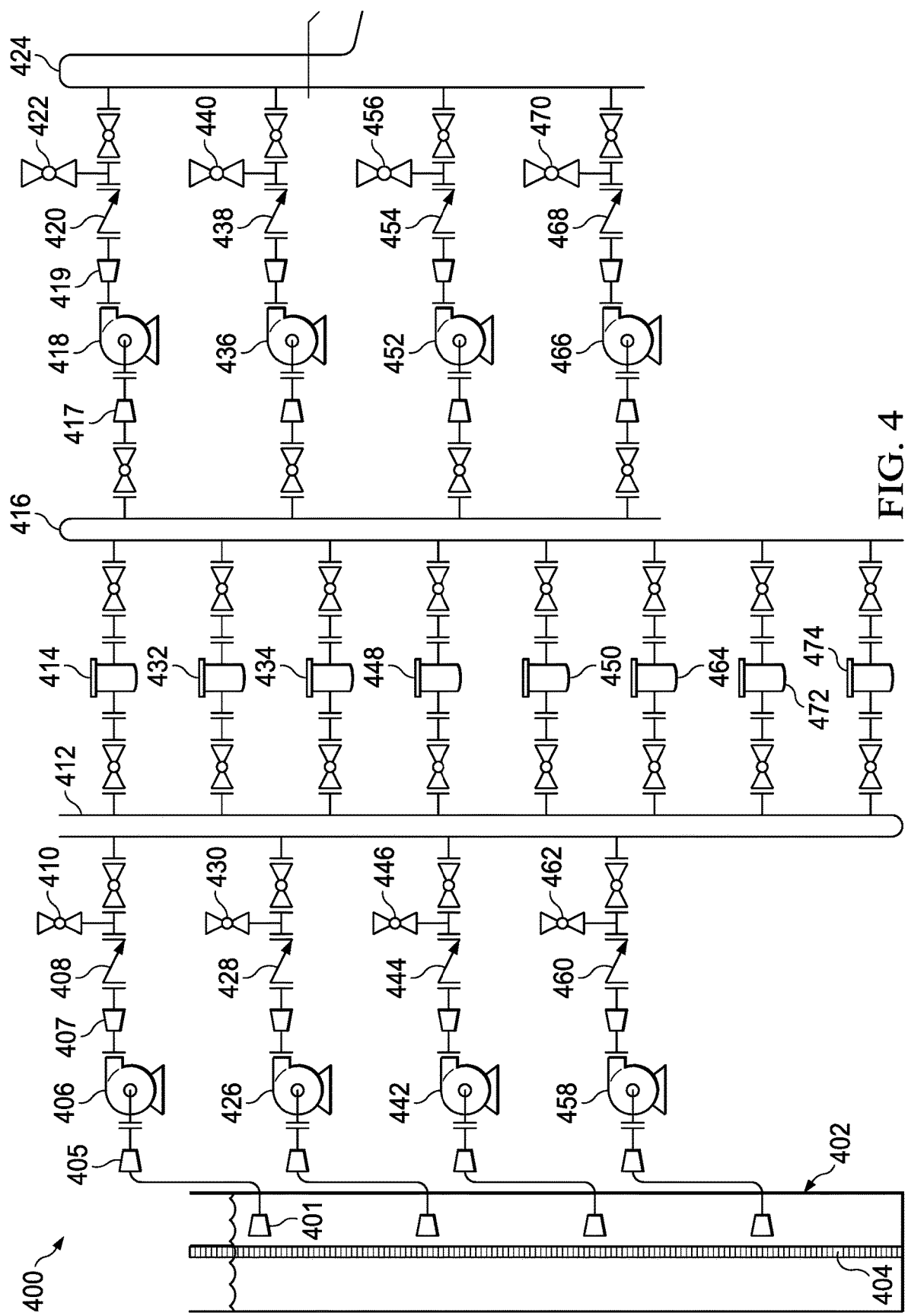
FIG. 4 is a schematic diagram of a preferred embodiment of a flood water intake system.

Referring then to FIG. 4, a preferred embodiment of a floodwater intake plant will be described.

Floodwater intake plant 400 is comprised of intake canal 402 and screen 404. Intake canal 402 may be connected to existing floodwater redistribution systems. Screen 404 prevents trash and other debris from entering the pump station.

Floodwater intake plant 400 is further comprised of first centrifugal pumps 406, 426, 442, and 458 connected to check valves 408, 428, 444, and 460. In a preferred embodiment, the centrifugal pumps are 3,000 hp and include a power indicator and a combination voltage switch and alarm. The check valves are further connected to ball valves 410, 430, 446, and 462. In a preferred embodiment, ball valves 410, 430, 446, and 462 include pressure and vacuum sensors and indicators.

Floodwater intake plant 400 is further comprised of centrifugal strainers 414, 432, 434, 448, 450, 464, 472, and 474, and second centrifugal pumps 418, 436, 452, and 466. The second centrifugal pumps are further connected to check valves 420, 438, 454, and 468, which are connected to ball valves 422, 440, 456, and 470, as previously described.

Water flows from intake canal 402 to the pumps through a set of pipes and concentric reducers. For instance, water flows through pipeline 401 to concentric reducer 405 into pump 406. In a preferred embodiment, pipeline 401 is 96" in diameter and concentric reducer 405 is a 96"×72" reducer. Each pipeline also includes a concentric expander between the first set of centrifugal pumps and check valves, such as expander 407.

Water flows from the first set of pumps and valves through process line 412 to the centrifugal strainers. In a preferred embodiment, process line 412 is a 120" diameter pipe. Water passes from the centrifugal strainers through process line 416 to the second set of pumps and valves. In a preferred embodiment, process line 416 is a 120" diameter pipe. For instance, the water flows through concentric reducer 417 to pump 418 then through concentric expander 419 to check valve 420, as previously described. Water flows from the second set of pumps and valves to another onshore pump station or offshore platform through process line 424. In a preferred embodiment, process line 424 is a 96" diameter pipeline.

In this embodiment, the plant contains four first centrifugal pumps and check valves, eight centrifugal strainers, and four second centrifugal pumps and check valves. In other embodiments, the first set may contain different numbers of pumps and valves, as will be recognized by those of skill in the art. The system may also contain any number and size of valves, pipes, pressure and vacuum sensors, and reducers/expanders needed to achieve optimal flow rates.

Figure 5:
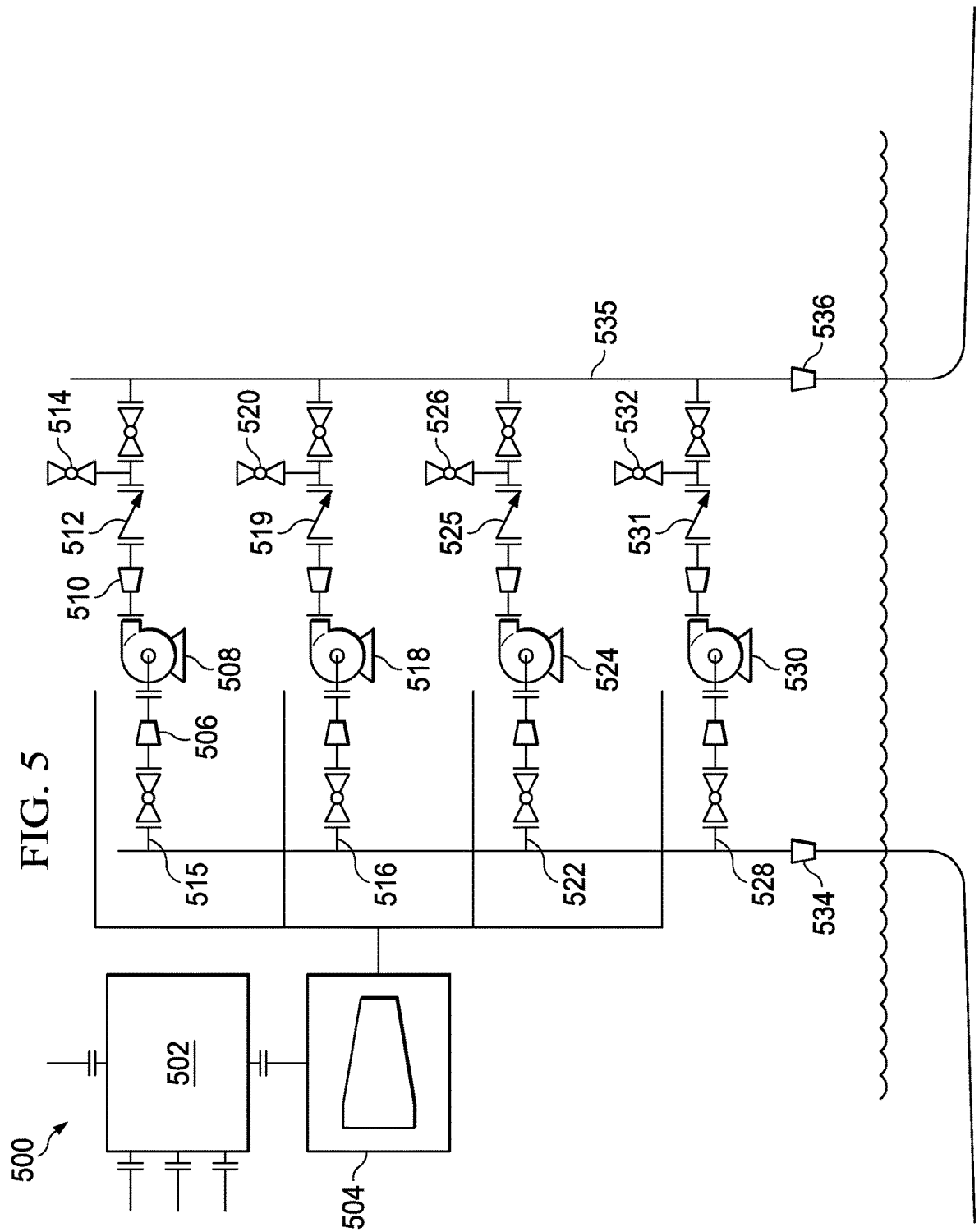
FIG. 5 is a schematic diagram of a preferred embodiment of an offshore platform in a floodwater redistribution system.

Referring then to FIG. 5, a preferred embodiment of offshore platform 500 is described.

Offshore platform 500 is comprised of centrifugal pumps 508, 518, 524, and 530 connected to check valves 512, 519, 525, and 531. In a preferred embodiment, the centrifugal pumps are 6,500 hp and include a power indicators and combination voltage switch and alarms. The check valves are further connected to ball valves 514, 520, 526, and 532. In a preferred embodiment, ball valves 514, 520, 526, and 532 include pressure and vacuum sensors and indicators.

Water flows into offshore platform 500 through concentric expander 534. In a preferred embodiment, concentric expander is a 96"×120" expander. Water then flows into pipelines 515, 516, 522, and 528 to each pump. Each of pipelines 515, 516, 522, and 528 include a concentric reducer, such as reducer 506. In a preferred embodiment, reducer 506 is a 120"×96" reducer.

The water flows from the centrifugal pumps through concentric expanders, such as expander 510, to the check valves. In a preferred embodiment, the concentric expanders between the pumps and check valves are 72"×96" expanders. The water flows out of the offshore platform through process line 535 and concentric reducer 536. In a preferred embodiment, process line 535 is 120" diameter pipe connected to reducer 536 which is a 120"×96" reducer further connected to a 96" diameter pipeline.

In a preferred embodiment, the pumps are fueled using diesel or bio-diesel stored in tank 502. Tank 502 includes high-level and low-level combination switch and alarm devices. Tank 502 is connected to generator 504. In a preferred embodiment, generator 504 is 20,000 Kw.

In alternate embodiments, onshore pumps are electric and can be powered using wind turbines.

Figure 6:
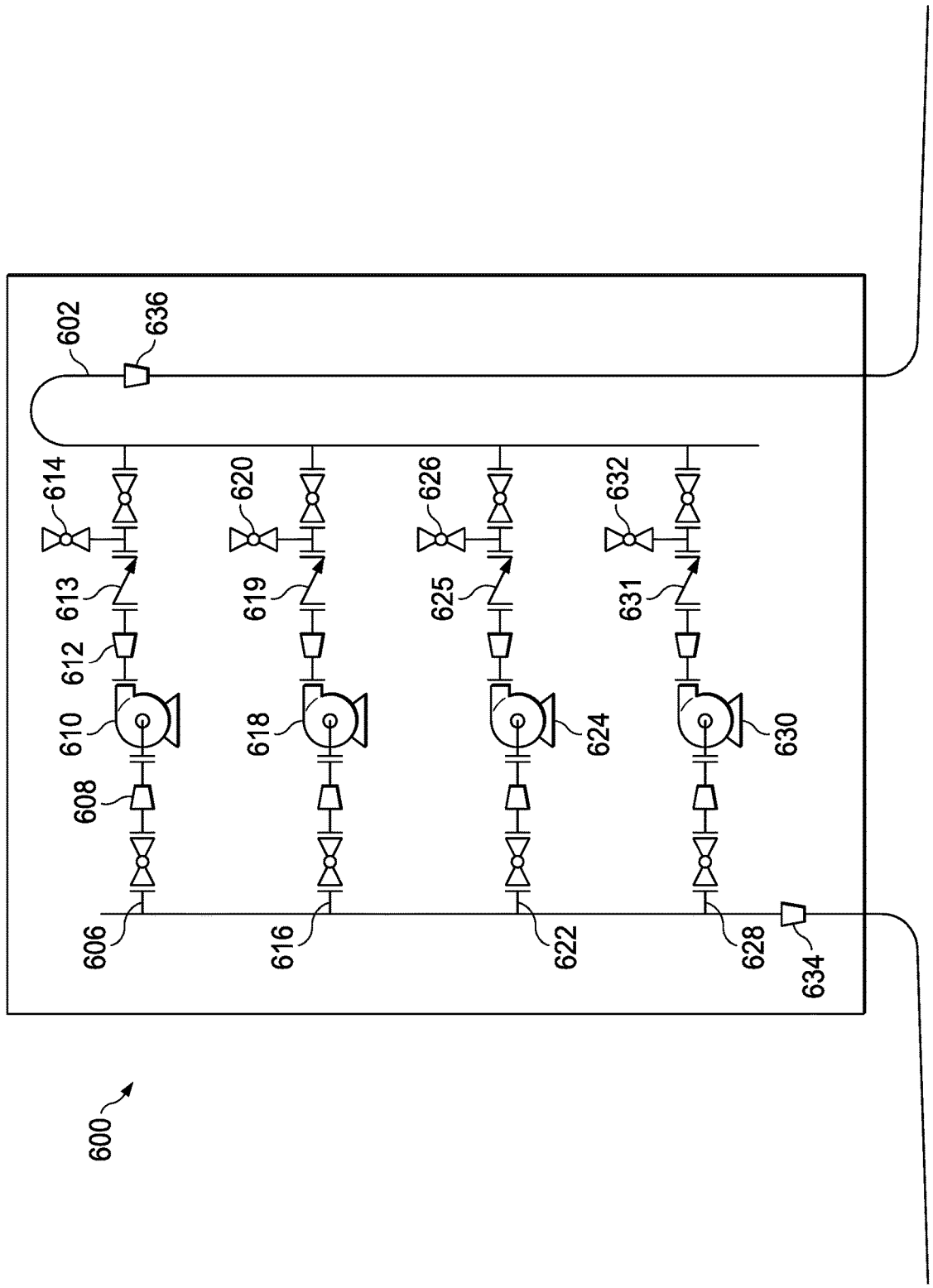
FIG. 6 is a schematic diagram of a preferred embodiment of an onshore pump station in a floodwater redistribution system.

Referring then to FIG. 6, a preferred embodiment of an onshore pump station is described.

In situations where a floodwater redistribution system already exists, such as in New Orleans, a pump station, such as onshore pump station 600, may be utilized instead of floodwater intake plant 400. The pump stations may be used in conjunction with the existing flood water redistribution system. Integrating the pump stations with existing floodwater redistribution systems reduces costs while still extending the range of floodwater redistribution.

Onshore pump station 600 is comprised of centrifugal pumps 610, 618, 624, and 630 connected to check valves 613, 619, 625, and 631. In a preferred embodiment, the centrifugal pumps are high flow high pressure 6,500 hp pumps and include a power indicators and combination voltage switch and alarms. The check valves are further connected to ball valves 614, 620, 626, and 632. In a preferred embodiment, ball valves 614, 620, 626, and 632 include pressure and vacuum sensors and indicators.

Water flows into onshore pump station 600 through concentric expander 634. In a preferred embodiment, concentric expander is a 96"×120" expander. Water then flows into pipelines 606, 616, 622, and 628 to each pump. Each of pipelines 606, 616, 622, and 628 include a concentric reducer, such as reducer 608. In a preferred embodiment, reducer 608 is a 120"×96" reducer.

The water flows from the centrifugal pumps through concentric expanders, such as expander 612, to the check valves. In a preferred embodiment, the concentric expanders between the pumps and check valves are 72"×96" expanders. The water flows out of the onshore pump station through process line 602 and concentric reducer 636. In a preferred embodiment, process line 602 is 120" diameter pipe connected to reducer 636 which is a 120"×96" reducer further connected to a 96" diameter pipeline.

Figure 7:
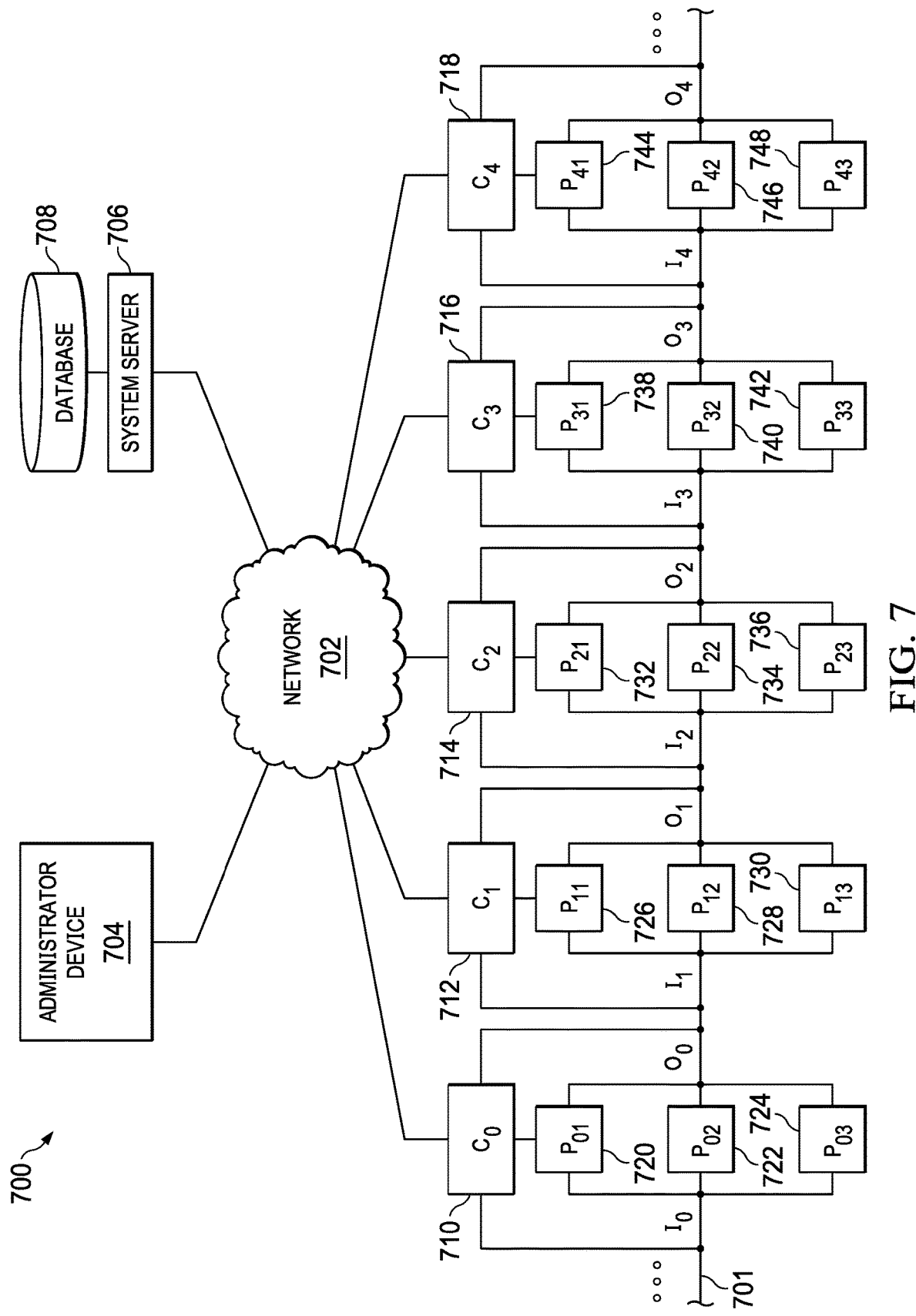
FIG. 7 is a network diagram of a preferred embodiment of a floodwater redistribution control system.

Referring then to FIG. 7, network architecture 700 for controlling a floodwater redistribution system will be described.

System server 706 is operatively connected to database memory 708. The system server is connected to network 702. Network 702 is a wide area network, such as the internet. Administrator device 704 is connected to system server 706 through network 702.

The system server is further connected to all the controllers, $C_{0-n}$, in the floodwater distribution system, such as controllers 710, 712, 714, 716, and 718. The controllers are connected to pressure sensors in the system and monitor the input head pressures, I, and output head pressures, O, of their associated pumps, $P_{1-n}$, as shown. The input and output head pressures recorded by each controller are timestamped and sent to the system server and stored in the database. The controllers further monitor and control all associated pump speeds which are timestamped and sent to the system server where they are stored in the database. In this embodiment, each controller is connected to three pumps, as an example, although a different number of pumps may be connected to a single controller, as required by varying pipeline requirements.

Controller 710 is operatively connected to pumps 720, 722, and 724. Controller 712 is operatively connected to pumps 726, 728, and 730. Controller 714 is operatively connected to pumps 732, 734, and 736. Controller 716 is operatively connected to pumps 738, 740, and 742. Controller 718 is operatively connected to pumps 744, 746, and 748.

The pump speeds may be manually adjusted at controllers 710, 712, 714, 716, and 718 to control associated input and output head pressures. Alternatively, the pump speeds are automatically adjusted to optimize water flow along pipeline 701, as will be further described.

Figure 8:
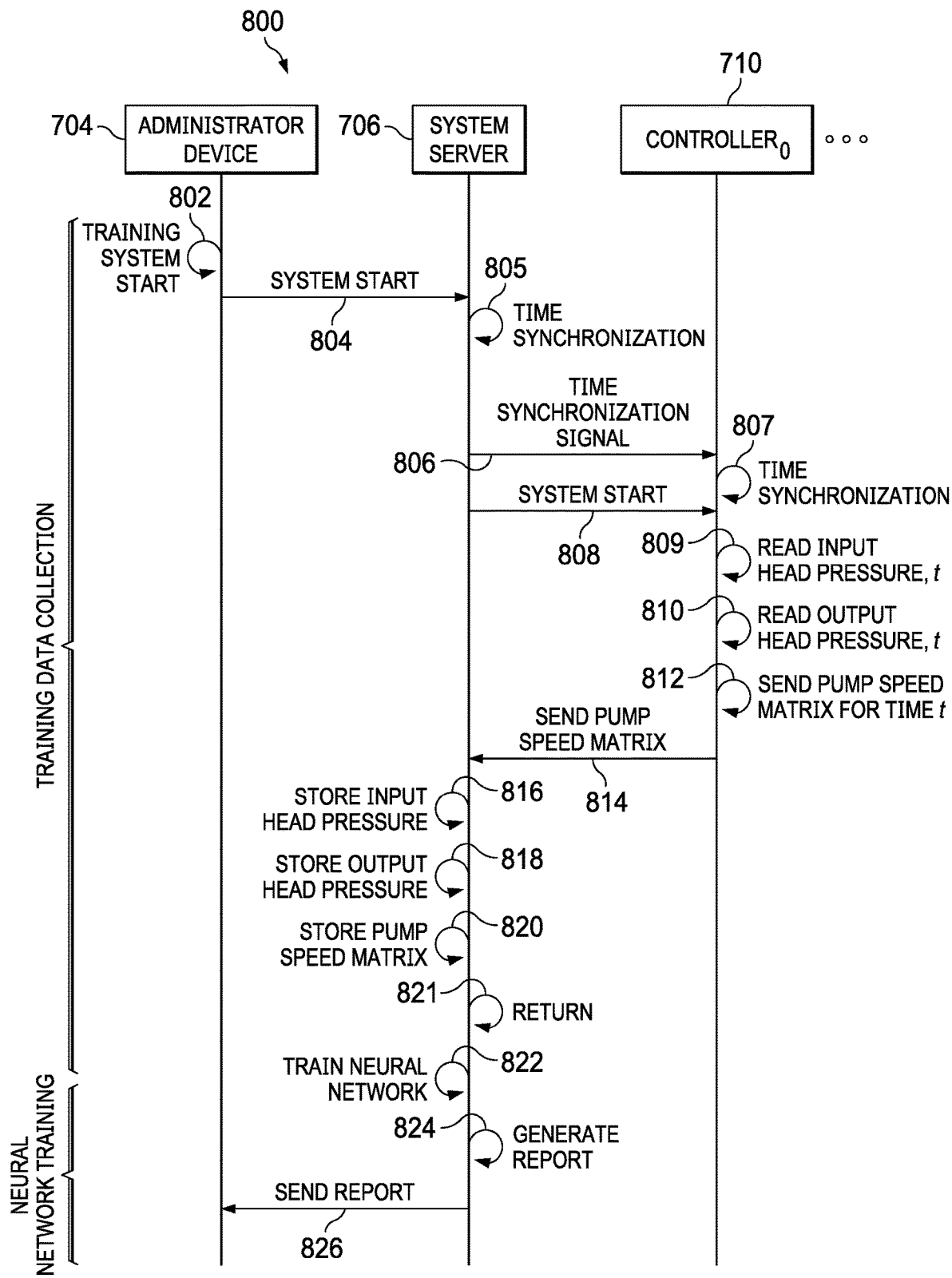
FIG. 8 is a flow chart of a method for training a floodwater redistribution system.

Referring then to FIG. 8, preferred method 800 for training a neural network for controlling floodwater distribution is described.

At step 802, a training is initiated at administrator device 704. In step 804, the system start is transmitted to the system server. At step 805, the system server initiates a time synchronization. At step 806, the time synchronization signal is transmitted to the controllers. At step 807, the time is synchronized between the controllers and the system server.

At step 808, system server 706 transmits the system start to all of the controllers, such as controller 710.

At step 809, controller 710 reads the input head pressure at time t. At step 810, the controller reads the output head pressure at time t. At step 812, a message including a matrix of pump speeds and the input and output head pressure measurements is generated to send to the system server. Importantly, the message also includes a time stamp of when all measurements are taken at a controller so that they may be associated with the measurements taken at all other controllers at the same time.

At step 814, the pump speed and input/output head pressure result matrix at time t is sent to the system server.

At step 816, the input head pressure is stored. At step 818, the output head pressure is stored. At step 820, the pump speed matrix is stored. Preferably, all data is indexed according to the timestamp of when the data was recorded.

At step 821, data collection steps 808 through 820 are repeated preferably between 10,000 times and 60,000 times to gather sufficient training data. Increasing the training epochs decreases neural network error.

At step 822 the neural network is trained, as will be further described. At step 824, a training status report is generated. At step 826, the training status report is transmitted to administrator device 704. Preferably, the training status report includes an estimate of expected neural network accuracy based on the current training data epoch.

Figure 9:
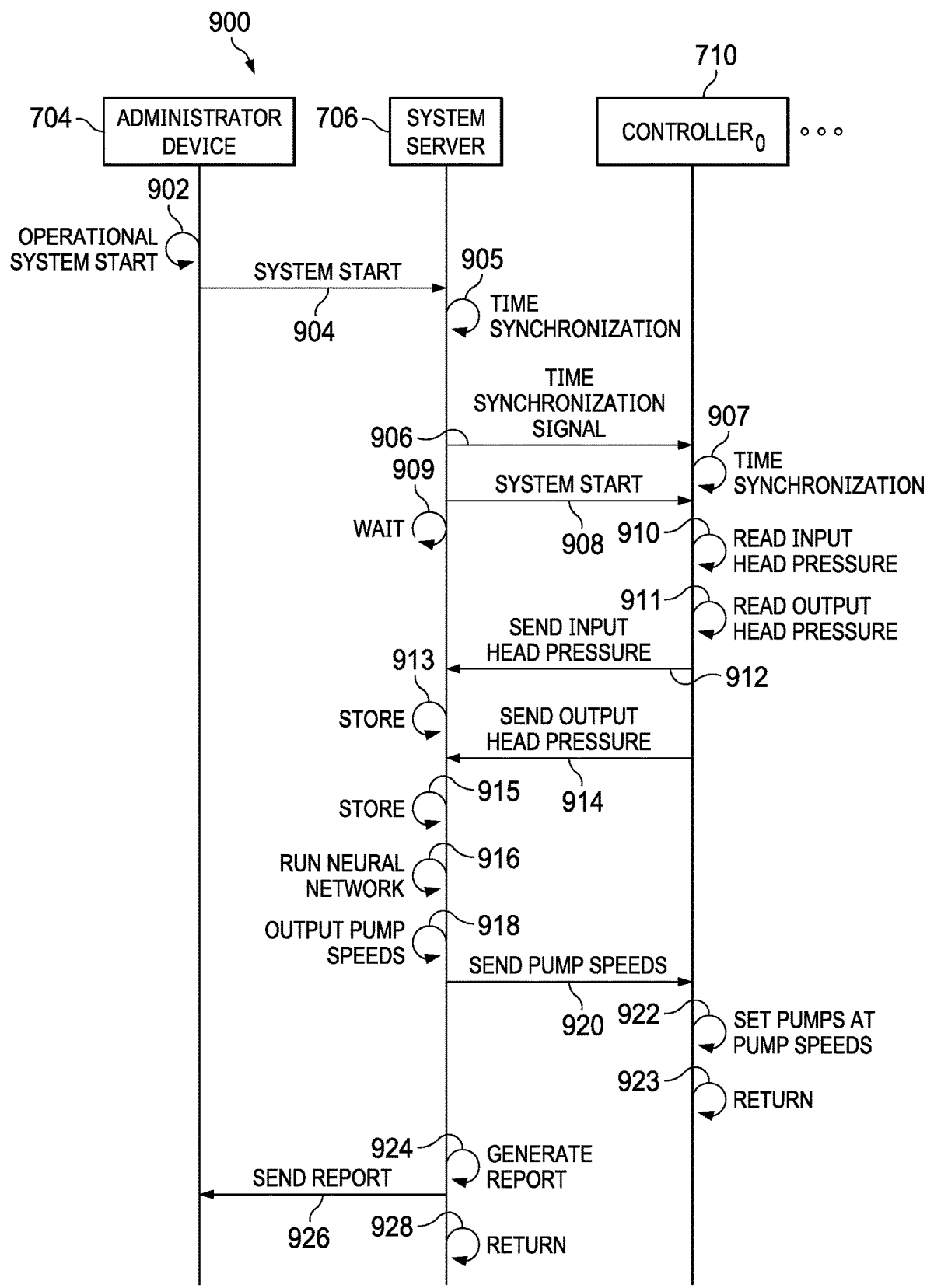
FIG. 9 is a flow chart of method for using a trained floodwater redistribution system.

Referring then to FIG. 9, preferred method 900 for using a trained neural network to control a floodwater distribution system is described.

At step 902, an operational system start is initiated at the administrator device. At step 904, the system start is transmitted to the system server. At step 905, the system server initiates a time synchronization. At step 906, the time synchronization signal is transmitted to the controllers. At step 907, the time is synchronized between the controllers and the system server.

At step 908, the system server forwards the system start to the controllers. At step 909, the system server waits for the input/output head pressures.

At step 910, controller 710 reads the input head pressure at time t. At step 911, the controller reads the output head pressure at time t.

At step 912, the input head pressure at time t is transmitted to the system server. At step 913, the system server stores the input head pressure, indexed by time t. At step 914, the output head pressure at time t is transmitted to the system server. At step 915, the system server stores the output head pressure, indexed by time t.

At step 916, the neural network is activated to determine the pump speeds based on the input and output head pressures at time t. At step 918, the neural network generates the pumps speeds for all the controllers for time t+1, as will be further described. At step 920, the pump speed settings are forwarded to the controllers. At step 922, each controller sets the pumps at the designated pump speeds. At step 923, the controller returns to step 908.

At step 924, the system server generates a status report. The report preferably indicates input and output head pressures, pump speeds and efficiencies, filter status and pipeline throughput. At step 926, the report is sent to the administrator device. At step 928, the system server returns to step 909.

Figure 10:
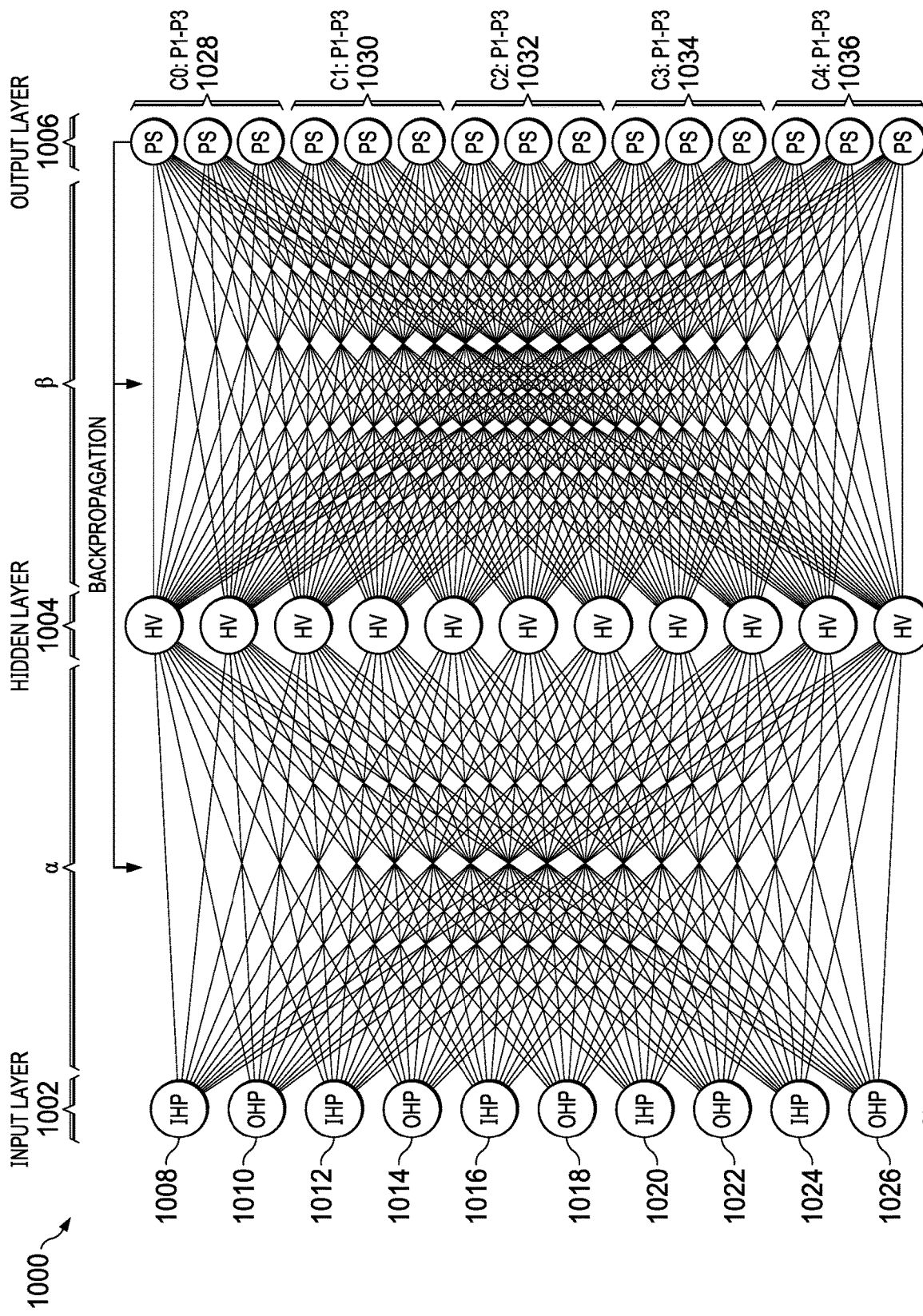
FIG. 10 is a preferred embodiment of an artificial neural network for a floodwater distribution system.

Referring then to FIG. 10, a preferred embodiment of a single artificial neural network for predicting pump speeds to produce optimal flow in a flood water redistribution system will be further described. Neural network 1000 includes input layer 1002, hidden layer 1004, and output layer 1006. Other numbers of nodes and layers may be used.

Input layer 1002 has one node for each of the input head pressure and output head pressure for all of the controllers at time t. In this example, input layer 1002 consists of ten (10) input nodes comprised of five (5) sets of (2) values. The input nodes are representative of the input head pressures (IHP) and output head pressures (OHP) of each controller. In this example, input layer 1002 is comprised of controller 0 IHP node 1008, controller 0 OHP node 1010, controller 1 IHP node 1012, controller 1 OHP node 1014, controller 2 IHP node 1016, controller 2 OHP node 1018, controller 3 IHP node 1020, controller 3 OHP node 1022, controller 4

IHP node 1024, and controller 4 OHP node 1026. In other embodiments, the input layer may have a greater or lesser number of nodes based on the number of controllers in the system. In this example, input data is a 10×1 matrix with the input/output data for five (5) controllers. Training data further includes an output value for each data set.

Each node of input layer 1002 is connected to each node of hidden layer 1004 via a set of hidden layer, α, synapses. Each α synapse is assigned a weight between 0 and 1. The input layer nodes are multiplied by the α synapses, summed, and processed using an activation function to produce the hidden layer nodes, as will be further described.

In a preferred embodiment, hidden layer 1004 is comprised of eleven (11) weighted nodes. Hidden layer 1004 preferably includes a bias node. The inclusion of a bias node reduces the variance and increases efficiency. One of skill in the art will recognize that other arrangements, numbers and layers of neurons are possible that may provide the desired predictive features of the invention.

Each node of hidden layer 1004 is connected to output layer 1006 by output layer, β, synapses. Each β synapse is assigned a weight between 0 and 1.

Neural network 1000 produces fifteen (15) nodes comprised of five (5) sets of three (3) values. The sets of values indicate the pump speeds for each pump associated with controllers $C_{0-n}$ at time t+1. In this example, output layer 1006 is comprised of set 1028 representing the values for controller 0 pumps P1-P3, set 1030 representing the values for controller 1 pumps P1-P3, set 1032 representing the values for controller 2 pumps P1-P3, set 1034 representing the values for controller 3 pumps P1-P3, and set 1036 representing the values for controller 4 pumps P1-P3. After training, when queried with a new data set, each neural network produces a set of values for every controller. The nodes of hidden layer 1004 are multiplied by the β synapses and summed to produce an unweighted value. The unweighted value is processed using an activation function to produce the weighted output, or pump speeds, for output layer 1006, as will be further described.

During back propagation, the derivative of the loss function is calculated and applied to the α and β synapses to train the network, as will be further described. Output layer 1006 contains the final output value of the neural network for each input data set.

Figure 11A:
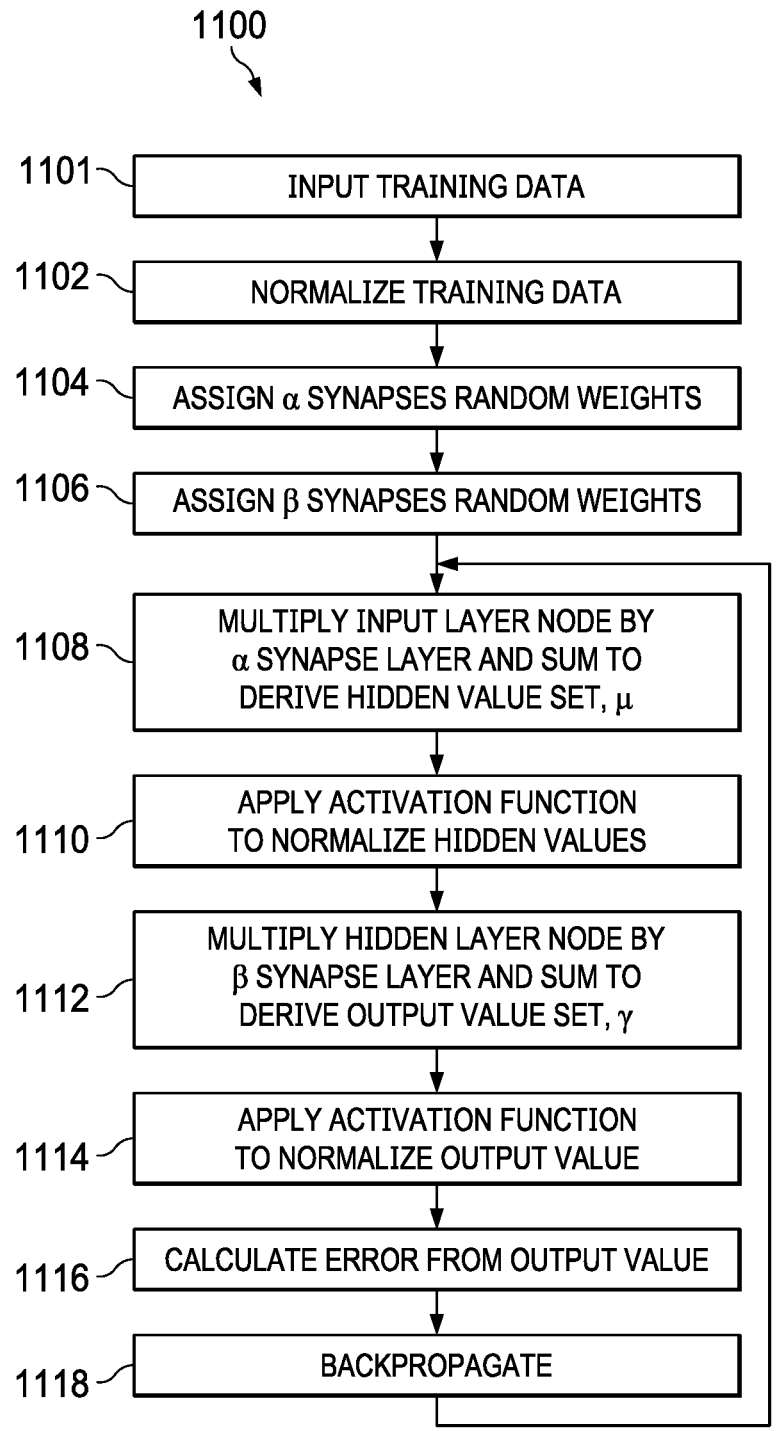
FIGS. 11A and 11B is a preferred method of training an artificial neural network.

Referring to FIG. 11A, a flow chart of method 1100 for training the artificial neural network will be described.

At step 1101, training data is input into the neural network. Training data is supplied to the algorithm as sets of 10×15 matrices of input/output head pressure (IHP/OHP) at time t and the associated ideal pump speeds (PS). In a preferred embodiment, 10,000 to 60,000 training data sets are required to derive an optimal set of synapse values.

An example of training data values is shown in Table 1. In this example, the input/output head pressure and pump speed values are merely exemplary.

TABLE 1

| Controller X | Input/Output Head Pressure (x) | Pump Speeds (y) |
|---|---|---|
| 1 | [2, 18] | [10, 3, 7] |
| 2 | [10, 15] | [15, 4, 2] |
| 3 | [8, 12] | [15, 3, 9] |
| 4 | [15, 10] | [7, 5, 11] |
| 5 | [9, 12] | [6, 13, 12] |
| . . . | . . . | . . . |
| n | [IHP$_n$, OHP$_n$] | [PS$_{1n}$, PS$_{2n}$, PS$_{3n}$] |

At step 1102, in a preferred embodiment, all input values are normalized to a value between 0 and 1 by dividing each variable by the maximum permitted value of the variables.

At step 1104, each of the α synapses are assigned a random weight, $α_n$, between 0 and 1. At step 1106, each of the β synapses are assigned a random weight, $β_n$, between 0 and 1.

At step 1108, the input values and the α synapse weights are multiplied in a matrix operation and summed to determine hidden value, for each node n in hidden layer 1004, according to the following equation:

$$HV_{mn} = \Sigma HP_n \times α_m$$

where:
n=number of input/output head pressure nodes; and
m=number of hidden nodes.

At step 1110, the activation function is applied to the set of hidden values, $HV_{mn}$. In a preferred embodiment, the activation function is the Sigmoid function. The Sigmoid function is preferred because its derivative can be efficiently calculated. The activation function is shown below:

$$Ω_n = S(HV_{mn}) = \frac{1}{1 + e^{-HV_{mn}}} = \frac{e^{HV_{mn}}}{e^{HV_{mn}} + 1}$$

where:
$Ω_n$ is the value of nodes 111 of hidden layer 1004; and
$HV_{mn}$ is the hidden value of the hidden layer nodes.

At step 1112, the values $Ω_n$ and the β synapse weights are multiplied in a matrix operation and summed to determine summation value, γ, according to the following equation:

$$γ = \Sigma Ω_n \times β_m$$

At step 1114, the activation function is applied to the value, γ, calculated in step 1112 to produce an output value for output layer 1006.

At step 1116, the error is calculated mean sum squared loss function. The mean sum squared loss function is the sum for all data points of the square of the difference between the predicted and actual target values divided by the number of sets of data, according to the following equation:

$$\text{Error} = \Sigma \frac{(\text{Output}_n - y_n)^2}{n}$$

where:
Output$_n$ is the predicted pump speed; and
$y_n$ is a known pump speed input in the system in step 1101.

In step 1118, the neural network backpropagates to minimize Loss, as will be further described.

Steps 1108 through 1118 are repeated for a preset number of iterations. In a preferred embodiment, a preset number of iterations is used, anywhere from 20,000 to 200,000. Once the system executes the number of iterations, the neural network is considered "trained" and the ideal values of α and β synapses are stored. In an alternate embodiment, if an ideal error, such as 0.01%, is achieved prior to executing all iterations, the neural network is similarly considered trained. Other iteration counts and ideal errors may be used. A higher iteration count reduces the Error and increases the accuracy of the synapse weights. However, too many training sessions may also result in overfitting the neural network.

Figure 11B:
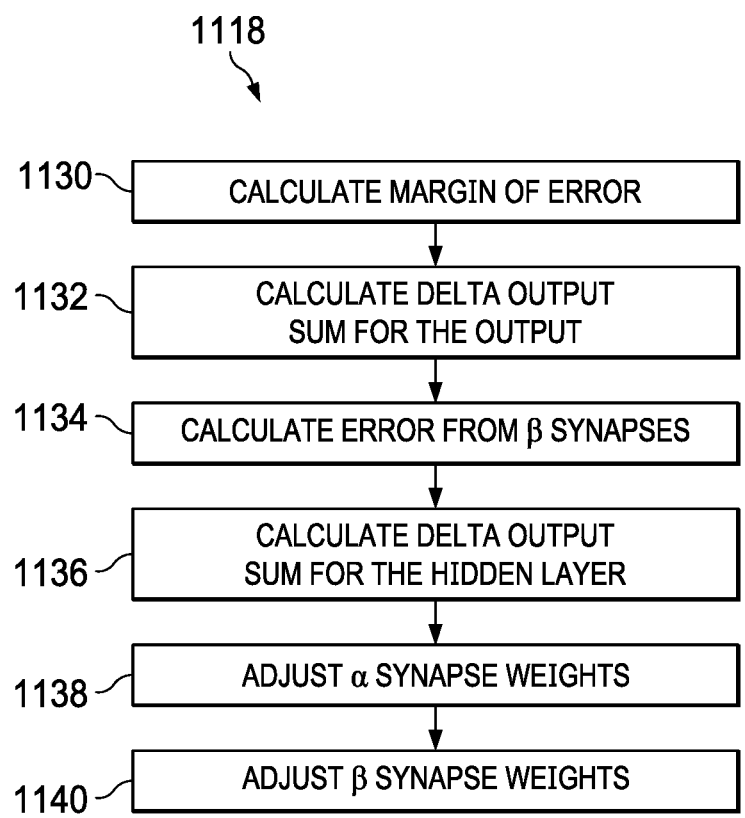

Referring then to FIG. 11B, a preferred method for backpropagation in step 1118 is described.

At step 1130, the margin of error of output layer 1006, error margin, is calculated according to the following equation:

$$\text{Error Margin} = y_n - \text{Output}_n$$

At step 1132, the delta output sum for output layer 1006, $\Delta_1$, is calculated. The delta output sum, $\Delta_1$, is calculated by applying the derivative of the sigmoid activation function to the output error calculated in step 1130. The derivative of the sigmoid activation function for an output of "x" is x(x−1).

At step 1134, determine the error attributable to hidden layer 1004, the hidden error. The hidden error is calculated by calculating the dot product of the delta output sum, $\Delta_1$, and the β synapse weights.

At step 1136, the delta output sum for hidden layer 1004, $\Delta_2$, is calculated by applying the derivative of the sigmoid activation function to the hidden error calculated in step 1134, as previously described.

At step 1138, the α synapses weights are adjusted by calculating the dot product of input layer 1002 nodes and the delta output sum, $\Delta_2$. At step 1140, the β synapses weights are adjusted by calculating the dot product of hidden layer 1004 nodes and the delta output sum, $\Delta_1$. The adjusted weights are returned, and the neural network uses the new weights in the next training iteration. When the network has trained the present number of iterations the weights are fixed at the values with the lowest mean sum squared loss error.

An example of computer code written in Python to perform one example of the method is shown in FIGS. 12A, 12B and 12C. Of course, other code may be used to implement this and other embodiments of the artificial neural network described.

Referring then to FIG. 12A, at line 1, the NumPy library is imported to perform advanced mathematical functions, such as matrix multiplication, which is needed for neural networks. Additional or different libraries may be imported and used to achieve similar results, such as Tensorflow and Keras.

At lines 3-7, the training data is input as a matrix. As an example, five (5) sets of input and output head pressures at time t, x, are input and five (5) sets of pump speeds, y, are included. In practice between 1,000 and 25,000 data sets would be employed to train each neural network. At lines 9-10, the data is scaled by dividing the x array by its maximum value and the maximum x value and they array by 15, or the maximum pump speed. At lines 13-15, the data is split into training and testing data. In this example, the first five sets of xy data are used to train the neural network. Once training is complete, the neural network is tested by predicting a set of pump speeds for the sixth set of head pressure.

At lines 17-23, the neural network is created. In this example, the network has one input layer with ten (10) nodes, one output layer with fifteen (15) nodes, and one hidden layer with eleven (11) nodes, as previously described.

At lines 25-27, the hidden layer synapse weights and the output layer synapse weights are defined as 11×10 and 11×15 arrays, respectively, and assigned random values.

At lines 29-35, a forward propagation function is defined. When called, the forward propagation function executes steps 1108 through 1114, as previously described. At lines 36-38, the sigmoid activation function is defined.

Referring then to FIG. 12B, at lines 40-42, the derivative of the sigmoid activation function is defined.

At lines 44-53, the back propagation function is defined. When called, the back propagation function executes steps 1130 through 1140, as previously described.

At lines 55-58, the system is set to train by using forward propagation to produce an output. At lines 60-63, the system is set to save the synapse weights. At lines 65-69, the system is set to print the input head pressure and output head pressure and the resulting predicted pump speeds at time t+1 for optimal flow after the neural network is trained.

Referring then to FIG. 12C, at lines 71-84, the system runs the neural network until it is trained. In this example the system will run 150,000 iterations of training unless an Ideal loss of 0.001% is achieved. In this example, during training, the neural network is set to print the scaled input, actual output, predicted output, and mean sum squared loss for each iteration run. Once the network is trained, at line 86, the system saves the ideal synapse weights. At line 87, the system predicts a set of pump speeds for the sixth set of input data. In a preferred embodiment, the training data would be updated upon entry of every data set from the controllers.

The invention claimed is:

1. A system for floodwater redistribution comprising:
 a plurality of geographically distributed onshore floodwater capture basins;
 a plurality of onshore pump stations, located on land, each onshore pump station of the plurality of onshore pump stations, including a first pump, and connected to at least one onshore floodwater capture basin of a plurality of onshore floodwater capture basins;
 a plurality of offshore pump stations, located in the ocean, each offshore pump station of the plurality of offshore pump stations, including a second pump, and connected to at least one onshore pump station of the plurality of onshore pump stations by an entrance transmission pipeline of a plurality of entrance transmission pipelines;
 wherein the plurality of offshore pump stations is connected in series by a plurality of sub sea-level transmission pipelines; and,
 wherein at least one terminal transmission pipeline is connected to a sub sea-level transmission pipeline of the plurality of sub sea-level transmission pipelines.

2. The system of claim 1 further comprising a release basin, adjacent the at least one terminal transmission pipeline.

3. The system of claim 1 wherein at least one entrance transmission pipeline of the plurality of entrance transmission pipelines is above sea level.

4. The system of claim 1 wherein at least one entrance transmission pipeline of the plurality of entrance transmission pipelines is below sea level.

5. The system of claim 1 wherein an onshore pump station of the plurality of onshore pump stations further comprises:
 an intake line;
 the intake line connected to a set of intake pumps further connected to a set of centrifugal filters;
 the set of centrifugal filters further connected to a set of exhaust pumps; and,
 the set of exhaust pumps further connected to an exhaust line.

6. The system of claim 5 wherein the set of intake pumps has a capacity of about 20,000 gallons per minute.

7. The system of claim 5 wherein the set of exhaust pumps has a capacity of about 20,000 gallons per minute.

8. The system of claim 1 wherein an offshore pump station of the plurality of offshore pump stations further comprises:
 an intake line;

the intake line connected to a set of through pumps; and,
the set of through pumps further connected to an exhaust line.

9. The system of claim 8 wherein the set of through pumps has a capacity of about 20,000 gallons per minute.

10. The system of claim 1 wherein an onshore pump station of the plurality of onshore pump stations further comprises:
an intake line;
the intake line connected to a set of through pumps; and,
the set of through pumps further connected to an exhaust line.

11. The system of claim 1 wherein the system has a throughput capacity of about 700,000 gallons per minute.

12. The system of claim 1 further comprising:
a set of input fluid flow sensors operatively connected to the plurality of onshore pump stations and the plurality of offshore pump stations;
a set of output fluid flow sensors, operatively connected to the plurality of onshore pump stations and the plurality of offshore pump stations; and,
a set of controllers, operatively connected to the set of input fluid flow sensors and the set of output fluid flow sensors, and in operational control of the plurality of onshore pump stations and the plurality of offshore pump stations.

13. The system of claim 12 further comprising:
a system server, connected to a network;
an administrator device, connected to the system server through the network;
the set of controllers, connected to the system server through the network;
a set of processors in the system server, the administrator device, and the set of controllers;
a set of memories, each memory of the set of memories operably connected to at least one processor in the set of processors;
the set of memories, including a set of instructions that, when executed causes the system to perform the steps of:
determining, at the set of controllers, a set of head pressure data from the set of input fluid flow sensors and the set of output fluid flow sensors;
receiving, at the system server, the set of head pressure data from the set of controllers;
receiving, at the system server, a first set of pump settings from the set of controllers;
generating a second set of pump settings related to the set of head pressure data; and,
receiving, at the set of controllers, the second set of pump settings.

14. The system of claim 13 wherein the set of head pressure data is comprised of a timestamp, a set of input head pressures, and a set of output head pressures for each controller of the set of controllers; and,
wherein the first set of pump settings and the second set of pump settings are comprised of at least one of a group of a set of timestamps, a set of power settings, a set of speed settings, and a set of flow direction settings.

15. The system of claim 14 wherein the step of generating the second set of pump settings further comprises the steps of:
determining a set of optimal values for the second set of pump settings based on the set of head pressure data;
normalizing the set of optimal values to a first range;
determining a set of weighted factors for the set of head pressure data within the first range;
summing the set of weighted factors to produce the second set of pump settings; and,
implementing the second set of pump settings at the plurality of onshore pump stations and the plurality of offshore pump stations.

16. The system of claim 13 further comprising:
an artificial neural network, resident on the administrator device, comprised of:
a input layer having a first set of nodes corresponding to the set of head pressure data;
a hidden layer, connected to the input layer by a first set of synapses, having a second set of nodes; and,
an output layer, connected to the hidden layer by a second set of synapses, corresponding to the second set of pump settings.

17. The system of claim 16 wherein the step of generating the second set of pump settings further comprises the step of training the artificial neural network by:
receiving at least one of a set of training head pressures;
receiving a set of training pump settings for the set of training head pressures;
setting a first set of random values for a first set of synapse weights, corresponding to the first set of synapses;
setting a second set of random values for a second set of synapse weights, corresponding to the second set of synapses;
calculating a first set of hidden values for the hidden layer by multiplying the set of training head pressures by the first set of synapse weights and summing;
applying an activation function to the first set of hidden values to derive a first set of node values;
multiplying the first set of node values by the second set of synapse weights and summing to derive a set of summation values;
applying the activation function to the set of summation values to derive a first set of predicted pump settings;
calculating an error in the first set of predicted pump settings using the set of training pump settings and,
adjusting the first set of synapse weights and the second set of synapse weights to create a third set of synapse weights and a fourth set of synapse weights to produce a trained artificial neural network.

18. The system of claim 17 wherein the step of generating the second set of pump settings further comprises:
calculating, using the trained artificial neural network, a second set of hidden values by multiplying the set of head pressure data with the third set of synapse weights and normalizing; and,
calculating the second set of pump settings by multiplying the second set of hidden values with the fourth set of synapse weights and summing a second set of node values.

* * * * *